US006746742B2

(12) United States Patent
Roth

(10) Patent No.: US 6,746,742 B2
(45) Date of Patent: Jun. 8, 2004

(54) STEALTH TIED LABEL LAMINATE

(75) Inventor: Joseph D. Roth, Springboro, OH (US)

(73) Assignee: NCR Corporation, Dayton, OH (US)

( * ) Notice: Subject to any disclaimer, the term of this patent is extended or adjusted under 35 U.S.C. 154(b) by 69 days.

(21) Appl. No.: 10/158,653

(22) Filed: May 30, 2002

(65) Prior Publication Data

US 2003/0224134 A1 Dec. 4, 2003

(51) Int. Cl.[7] .............................. B32B 3/00; G09F 3/02
(52) U.S. Cl. .................... 428/40.1; 428/41.4; 428/41.9; 428/42.3; 428/192; 428/195; 283/81; 283/101
(58) Field of Search .............................. 428/40.1, 41.9, 428/42.3, 41.4, 192, 195; 283/81, 101

(56) References Cited

U.S. PATENT DOCUMENTS

| | | | |
|---|---|---|---|
| 4,771,891 A | 9/1988 | Sorensen et al. | |
| 5,284,689 A | * 2/1994 | Laurash et al. | 428/40 |
| 5,421,942 A | 6/1995 | Hoffmann | |
| 5,580,640 A | * 12/1996 | Kraft et al. | 428/195 |
| 5,591,290 A | 1/1997 | Walter et al. | |
| 5,642,906 A | 7/1997 | Foote et al. | |
| 5,700,536 A | 12/1997 | Steidinger | |
| 5,855,395 A | 1/1999 | Foote et al. | |
| 6,217,078 B1 | 4/2001 | Roth et al. | |
| 6,254,952 B1 | 7/2001 | Fox et al. | |
| 6,410,111 B1 | 6/2002 | Roth et al. | |
| 6,432,499 B1 | 8/2002 | Roth et al. | |

FOREIGN PATENT DOCUMENTS

| | | |
|---|---|---|
| EP | 1 031 958 A1 * | 8/2000 |
| JP | 2-121896 | 5/1990 |

OTHER PUBLICATIONS

NCR Corporation, "Walgreens Customer Receipt," Identified Vertical release skip in products sold in U.S.A. for more than one year before May 30, 2002.

* cited by examiner

*Primary Examiner*—Harold Pyon
*Assistant Examiner*—Brian P. Egan
(74) *Attorney, Agent, or Firm*—Francis L. Conte

(57) ABSTRACT

A label laminate includes a face sheet with a die cut label adhesively bonded to a release liner. An isolated stealth tie is hidden between the label and liner to effect a locally stronger bond therebetween.

32 Claims, 3 Drawing Sheets

STEALTH TIED LABEL LAMINATE

BACKGROUND OF THE INVENTION

The present invention relates generally to pressure sensitive label sheets, and, more specifically, to printed label sheets.

Pressure sensitive labels are commonly arranged in groups in a laminate of a face sheet adhesively bonded to an underlying release liner. The adhesive is permanently bonded to the back of the individual labels and forms a weak bond with the liner which typically has an exposed silicone surface permitting individual label removal therefrom.

The individual labels are typically defined by full perimeter die cuts which completely sever adjoining labels from each other atop a common liner. By lifting the edge of an individual label, the label may be readily peeled away from the liner independently of adjacent labels, with the so removed label then being reattached to another surface using the same adhesive carried on the back of the label for effecting a bond therewith, which is typically permanent.

The adhesive must be suitably tailored in strength for maintaining integrity of the entire label laminate to prevent premature delamination of any of the individual labels thereon, while also permitting individual removal of the labels, with the perimeter die cuts preventing simultaneous multiple label removal.

Premature delamination of a label can occur in a typical laser printer if the label-liner bond is not sufficiently strong. A laser printer includes a hot fusion roller which softens the adhesive and may permit delamination especially where the laminate bends during its travel through the printer typically around narrow drive or guide rollers therein.

U.S. Pat. No. 6,254,952—"Strip Tied Label Sheet," discloses the use of local interruptions in the face sheet die cut to provide small paper ties near the leading edge of a label sheet for preventing delamination in the laser printer. Those ties are specifically located to prevent the interruption in the perimeter continuity of the label die cuts for permitting unrestrained removal of the individual labels, while preventing premature delamination in the laser printer.

This is particularly important for pharmacy script label sheets which combine multiple labels and an integrated form sheet. The efficiency of the pharmacy transaction is improved by permitting easy removal of individual labels without paper tie connection to adjoining labels, yet premature label delamination in the printer must be prevented.

Since the individual labels in the pharmacy script are not physically tied together, they may be subject to premature delamination depending upon the configuration of the labels and the configuration of the specific printer in which they are used.

The introduction of paper ties between adjoining labels is generally not desirable since the ties must be torn to remove individual labels from each other, and the paper ties provide no different connection with the underlying liner.

Accordingly, it is desired to provide an improved label sheet laminate maintaining full perimeter die cut labels while preventing premature delamination of the labels when used in a laser printer, for example.

BRIEF SUMMARY OF THE INVENTION

A label laminate includes a face sheet with a die cut label adhesively bonded to a release liner. An isolated stealth tie is hidden between the label and liner to effect a locally stronger bond therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
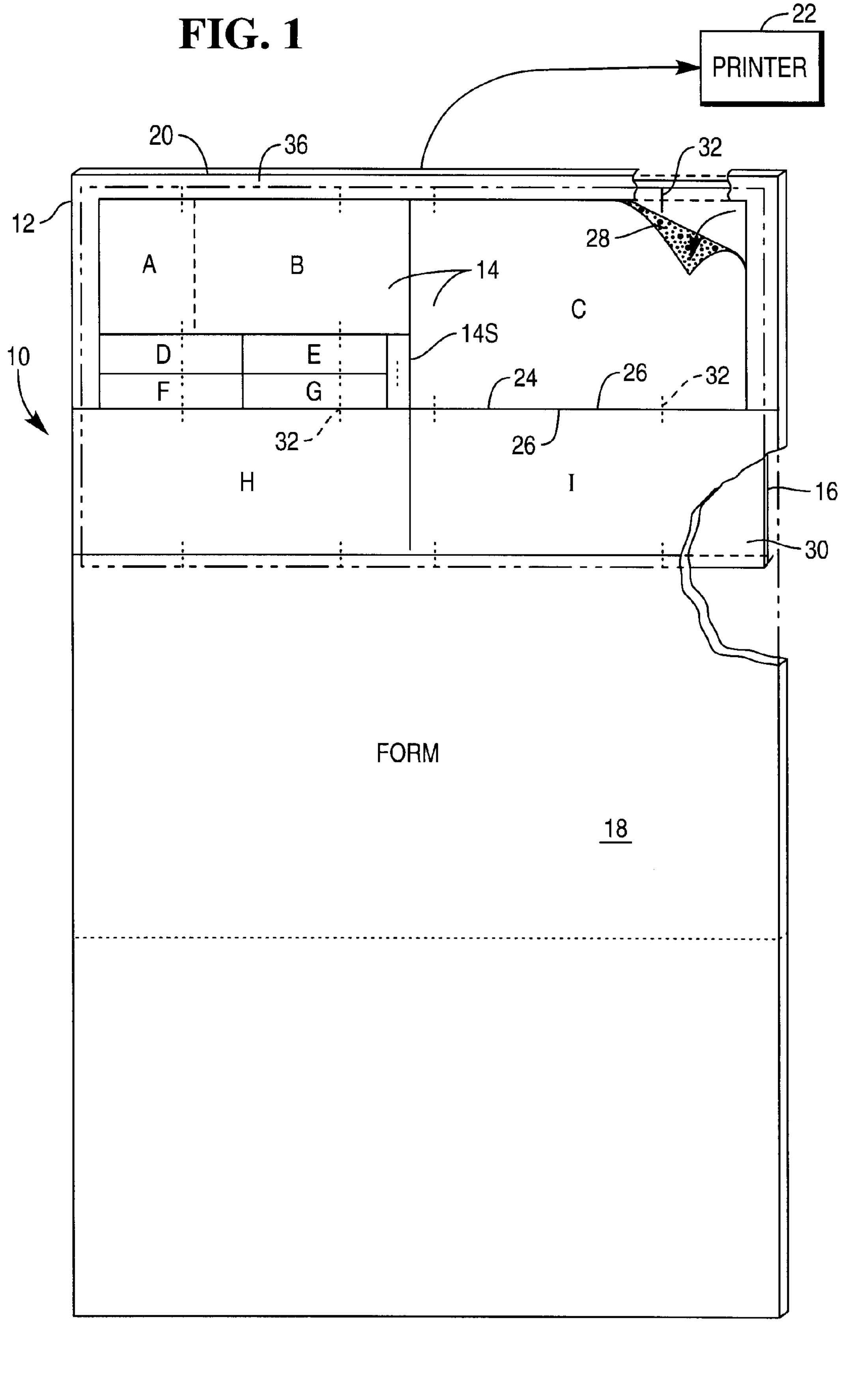
FIG. 1 is a plan view of a label laminate in accordance with an exemplary embodiment of the present invention.

Illustrated in FIG. 1 is a label laminate 10 in accordance with an exemplary embodiment of the present invention. The laminate includes a paper face sheet 12 having a plurality of pressure sensitive labels 14 disposed therein and adhesively bonded to an underlying release liner 16 forming a two-ply lamination.

The label sheet is configured in the form of an exemplary pharmacy script integrally joined with a single-ply form sheet 18 suitably configured for effecting a typical pharmacy transaction.

For example, the form sheet 18 is configured for recording details of the pharmacy transaction, including instructions for use of the medicine or pharmaceutical drugs being dispensed. The form may include a horizontal line of microperforations for permitting clean separation of the exemplary two halves thereof.

The face sheet includes several labels 14, individually designated by the letters A–I, which may be suitably configured for use in the transaction, and including, for example, a main label for permanent adhesive bonding with the intended drug container, and various smaller adhesive labels containing use or warning information for example.

The form sheet 18 may be integrated with the face sheet 12 in any suitable manner, such as being an integral portion thereof, with the release liner being substantially shorter in length and applied solely to the backside of the labels. The face sheet and liner therefore form a two-ply laminate, with the single-ply form sheet 18 extending downwardly from the liner.

In the exemplary embodiment illustrated in FIG. 1, the face sheet 12 and form sheet 18 define a single-ply continuous overlay of standard configuration, such as 8.5 by 11.5 inches. The face sheet overlay is therefore elongate and has a leading edge 20 extending along the top width thereof which is intended for first entering a conventional printer 22. A typical laser printer has a hot fusion roller therein and various narrow drive and guide rollers for transporting the label laminate through the printer for printing all desired information for the pharmaceutical transaction over the various labels 14 of the face sheet and over the form sheet 18.

Accordingly, the face sheet 12 may firstly enter the printer before the form sheet 18, with this intended travel through the printer defining the leading edge 20 of the face sheet, as well as corresponding leading edges of each of the several labels 14, with the trailing edges thereof last entering the printer.

Of course, the laminate could be fed through the printer in an opposite direction, with the form sheet 18 traveling first followed in turn by the face sheet 12. In which case, the roles of the leading and trailing edges would be reversed.

Although the face sheet illustrated in FIG. 1 may include a single label therein having suitably cut perimeter edges, it more typically includes several of the individual labels having various sizes and configurations and placements in the face sheet for the particular application intended. However, each label 14 is preferably defined by a continuous die cut 24 which surrounds the full perimeter of each label, with each die cut defining corresponding perimeter edges 26 of each label.

The exemplary labels illustrated in FIG. 1 have rectangular configurations, with four straight edges, several of which edges adjoin each other at common die cuts 24.

The backside of the face sheet 12 below all of the individual labels 14 has a uniform coating of pressure sensitive adhesive 28, and the top surface of the release liner has a uniform coating of release material 30, such as silicone, for forming a uniform first bond strength between the labels and the liner. The silicone release coating 30 may be a conventional premium release forming an easy peel adhesive bond with the pressure sensitive adhesive 28.

In this way, the individual labels may be easily peeled from the underlying liner, and reattached to the intended substrate, such as the pharmaceutical drug container, with a permanent bond thereto. The strength of the permanent bond is such that an attempt to remove the reapplied label would be difficult, if not impossible, and would most likely lead to tearing of the label from the substrate.

As indicated above, the label laminate is specifically configured for use in the printer 22, such as a laser printer which includes a hot fusion roller and various narrow drive and guide roller (not shown) which transport the laminate through the printer. The hot fusion roller causes adhesive in the laminate to soften and temporarily decreases its bonding strength with the liner. And, the narrow rollers may sharply bend the laminate in its transport through the printer tending to separate or delaminate one or more of the individual labels along their leading edges during transport.

In accordance with the present invention, the label laminate includes at least one isolated stealth tie 32 hidden between a corresponding one of the labels and the liner to locally bond the label to the liner with a second bond strength greater than the first bond strength. In this way, a locally small region of high-strength bonding between a label and the liner may be effected in the otherwise uniform low-strength bond between the entirety of the individual label and the liner. Each label is therefore easily peeled away from the liner with the typical premium release bond therewith, but locally includes an isolated high-strength bond formed by the stealth tie 32 to preferentially prevent premature delamination of the label as it is transported through the printer.

The stealth tie 32 may have various configurations and placement in the individual labels, but is preferably located along the corresponding leading edges thereof to prevent premature delamination. The stealth tie is hidden behind the label and does not interrupt the perimeter continuity of the label die cuts 24 for permitting easy removal of the individual labels from the remaining face sheet, without a mechanical paper tie between the adjoining edges of the label and the remaining face sheet. The absence of paper ties eliminates the need to tear those paper ties, and eliminates the possibility of inadvertent tearing of either the individual labels or the remaining portion of the face sheet.

The purpose of the stealth tie 32 is to locally tie an individual label to the underlying liner to prevent premature delamination of the label leading edge during the printing process, with the tie nevertheless being readily breakable when the label is peeled away from the liner for its intended use. Accordingly, each of the several stealth ties 32 that may be used in the label laminate illustrated in FIG. 1 preferably borders the corresponding label edge 26 to locally tie that label edge to the liner and locally interrupt the uniform first bond strength along the tied edge.

For the several removable labels A–I illustrated in FIG. 1, corresponding ones of the stealth ties 32 may be used along the corresponding label edges thereof to locally tie the edges to the underlying liner. These several labels vary in size from small to large and are tiled together in an efficient combination thereof maximizing the useful area of the face sheet for usable labels of different sizes and configurations, while minimizing scrap.

For example, a substantially small scrap label 14*s* is located near the center of the face sheet at the junction of six corresponding larger labels. The scrap label 14 is too small for practical use, and therefore utilizes a release skip 34 in the form of a thin singular line devoid of silicone centered in the scrap label inboard of its perimeter edges. The release skip 34 has a width larger than the width of the stealth ties 32 to effect a permanent bond between the scrap label and liner to prevent delamination thereof without damage to the scrap label or liner. The scrap label is thusly permanently retained on the liner as any one or more of the six surrounding larger labels is peeled away from the liner during use.

Figure 2:
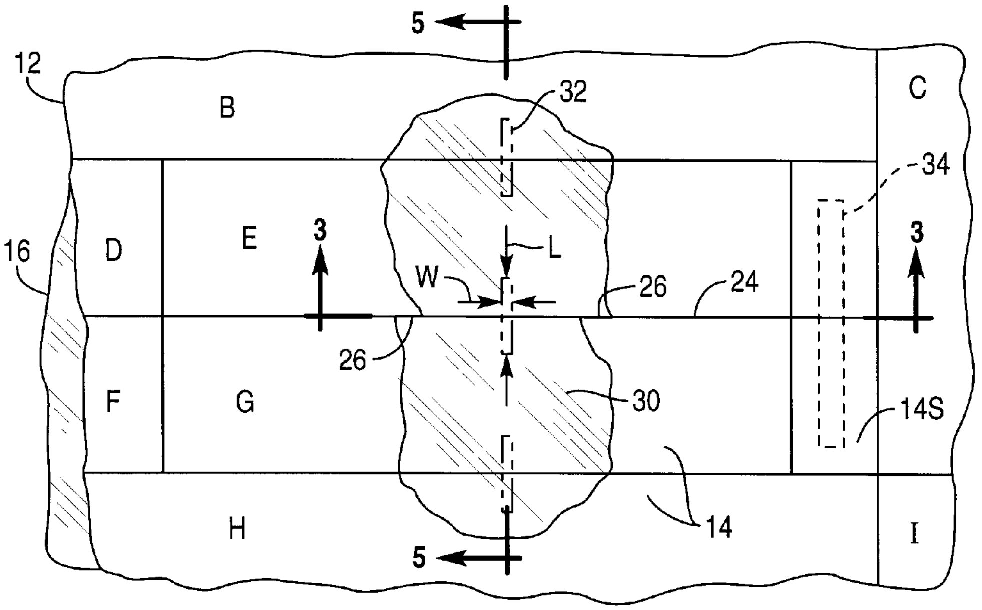
FIG. 2 is an enlarged view of a portion of the label laminate shown in FIG. 1 illustrating in cut-away three exemplary hidden stealth ties therein.

Several of the stealth ties 32 are illustrated in more detail in FIG. 2 in a preferred embodiment. Each stealth tie is elongate or narrow with a length L substantially greater than the corresponding width W thereof to form a thin line of minimal area.

Each stealth tie 32 is preferably rectangular in configuration, with a substantially constant and narrow width. In an alternate embodiment, the stealth tie may vary in width such as being a long, slender isosceles triangle. Alternatively, the stealth tie may be in the form of a dot of circular or square configuration, but such dot configuration will not enjoy the substantial advantages attributed to the line form of the stealth tie as further described hereinbelow.

In the preferred embodiment illustrated in FIG. 2, each stealth tie is inclined or askew from the corresponding label edge 26, and is preferably substantially perpendicular thereto. In this way, the narrow width W of the tie provides a minimal interruption in the continuity of the uniform first bond strength along the label edge for permitting easy peeling of the label away from the liner, with the longer length L of the tie being disposed perpendicular to the label edge in the direction of travel through the printer for maximizing the local increase in the second bond strength at the label edge in the direction of travel.

In this way, the additional retention force effected by the small stealth tie has minimal coverage parallel to the label edge and maximum coverage perpendicular thereto.

The individual stealth ties 32 are preferably made as small as possible to minimize the interruption in uniformity of the nominal first bond strength over the entire surface area of the individual labels, while still providing an isolated local increase in bond strength specifically configured for preventing premature label delamination in the printer. The tie width W and length L should be as small as practical, and the tie should be located directly adjacent the label edge from maximizing the bonding effect thereat.

Since the individual labels are defined by their perimeter die cuts 24 after the face sheet is laminated to the liner, the location of those die cuts is variable within the normal manufacturing tolerances effected in conventional die cutting. For example, the vertical location of the individual die cuts 24 illustrated in FIG. 2 in the direction of the intended travel of the label sheet in the printer may vary within plus or minus a sixteenth of an inch. In order to ensure that at least a portion of the stealth tie 32 along its length is disposed directly along the label edge, the tie length must be suitably greater than the corresponding tolerance range in location of the tie cut.

Accordingly, the stealth tie 32 is preferably located to bridge the corresponding label edge 26 between adjoining portions of the common face sheet, and the tie length L is preferably no greater than about double the tolerance range in position of the die cut label edge. With a die cut tolerance of about plus or minus one sixteenth of an inch, the corresponding tolerance range thereof is an eighth of an inch, and a suitable length L of the tie is about double that range, or about a quarter of an inch to ensure that a sufficient amount of the tie bridges the label edge for providing sufficient additional retention force for preventing delamination during printing. Extending the length of the stealth tie any more than required for preventing premature delamination merely increases the overall retention force and could lead to label damage for excessive retention forces.

In the preferred embodiment illustrated in FIG. 1, the several labels 14 are disposed in the common face sheet in rows and columns having corresponding die cut label edges therebetween. Since all of the labels 14 have corresponding leading edges which first enter the printer during use, all of the labels preferably include respective ones of the stealth ties 32 at least along the corresponding leading edges.

The several labels illustrated in FIG. 1 are ranged in corresponding pairs both vertically and horizontally along common die cut edges which preferably have a common one of the stealth ties 32 bridging the corresponding label pairs.

In this way, each stealth tie 32 may be used not only to locally tie each label edge with the underlying release liner but tie each label to the adjoining label using the common structural bridge effected by the overlapping stealth tie. As indicated above, the vertical location of each label edge is subject to variation due to manufacturing tolerances, and by using a common stealth tie 32 bridging adjoining labels, the size of the individual stealth tie may be minimized while still ensuring that a suitable length portion thereof underlies each of the adjoining labels for effective tying thereof.

In this way, the leading edge of one label may be effectively tied to the trailing edge of the preceding label, which permits transport of the label laminate in either top-first or bottom-first transport through the printer while still retaining effectiveness of the stealth ties to prevent premature delamination irrespective of the transport direction through the printer.

In the preferred embodiment illustrated in FIGS. 1 and 2, each label 14 includes a uniform coating of the pressure sensitive adhesive 28 over its entire back side for being initially removably bonded to the common underlying release liner. Correspondingly, the release liner may have any conventional configuration and typically includes a supercalendared kraft (SCK) paper substrate having a substantially uniform release coating 30 thereon, typically in the form of silicone applied in liquid form and suitably cured by ultraviolet light for example.

Figure 3:
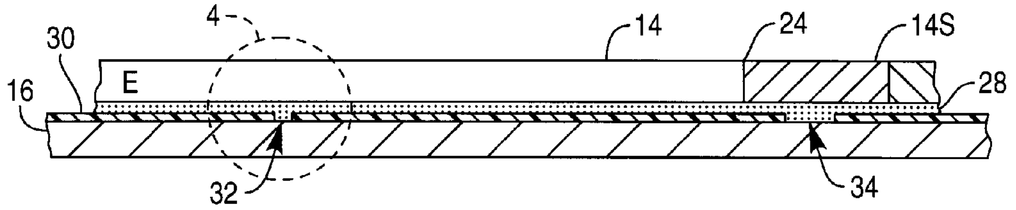
FIG. 3 is a sectional view between adjoining labels taken along line 3—3 in FIG. 2.
Figure 4:
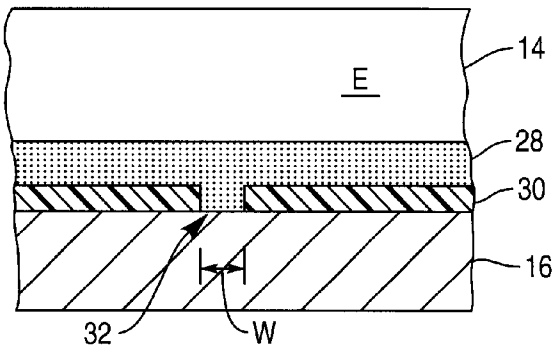
FIG. 4 is an enlarged transverse sectional view of the stealth tie illustrated in FIG. 3 within the circle labeled 4 in accordance with one embodiment of the present invention.

As illustrated in more detail in FIGS. 3 and 4, each of the stealth ties 32 is in the preferred form of a skip in the uniform release coating 30 which skip is devoid of release coating to expose the underlying substrate to form a direct bond with the common adhesive 28 on the label. In this way, the adhesive 28 itself is not only permanently bonded to the back side of the label 14, but is also practically permanently bonded directly to the liner substrate in the limited location of the release skip.

Figure 5:
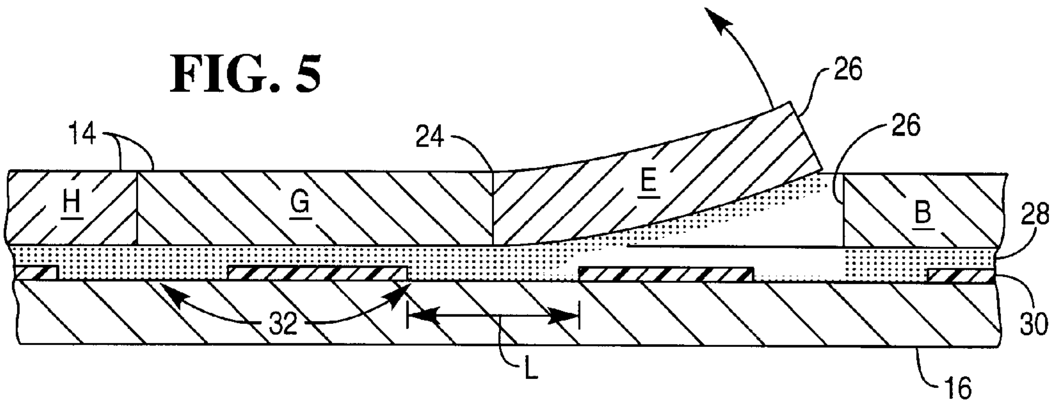
FIG. 5 is a longitudinal sectional view through the adjoining labels illustrated in FIG. 2 and taken along 5—5.

In this preferred embodiment of the stealth tie 32, the tie is minuscule in area to prevent a permanent bond between the label itself and the liner at the corresponding skip in release coating. Since the adhesive underlying the label itself may develop a permanent bond with the liner substrate at the tie location, the label can be peeled away from the liner with corresponding local tearing of the adhesive in the limited area of the stealth tie itself as shown in FIG. 5.

Accordingly, the size or area of the stealth tie 32 in this preferred configuration cannot be too large or the label will be locally permanently bonded to the liner substrate preventing its removal without significant damage or tearing of the label or liner. And, the size and area of the stealth tie should not be too small which would prevent an effective amount of additional retention force and bond strength greater than that provided by the nominal first bond strength provided between the uniform adhesive and the uniform release coating over the remainder of the interface between the label and liner.

In the preferred embodiment of the stealth tie 32 in the form of the silicone skip in the liner with direct bonding of the label adhesive therebetween, the area of the stealth tie may be minuscule in comparison with the overall area of the individual label representing a minute percentage of that area. For example, this form of label laminate and stealth tie has been built and tested, with the stealth tie 32 having a tested width W of 10 mils and 15 mils, and a tested length L of 250 mils.

The bonding effect of the 10 mil width was barely perceptible upon peeling away a label, whereas the bonding effect of the 15 mil width was substantial, and without damage to the label or liner. Accordingly, a suitable tie width between these tested values, preferably about 12 mils, is desired for effectively tying the individual labels 14 to the underlying release liner, yet permitting removal thereof without damage to the label or liner.

However, the maximum width of the stealth tie is limited in practice by resulting damage to the label or liner upon label removal, and may be up to about 20 mils to prevent such damage. The length of the stealth tie may have any suitable value since the width of the tie controls the local bonding force.

The rectangular stealth tie of these exemplary dimensions has an area up to about one (1) percent of the adhesive area of the smallest labels D–G illustrated in FIG. 1, and even smaller yet in area percentage relative to the remaining larger labels, all using the common form of this stealth tie.

For comparison purposes, the release skip 34 configured as a centered line for the scrap label 14*s* illustrated in FIG.

2 may have a width of about 47 mils, and a length of about a half inch for effecting a tie area of about 10.7 percent relative to the small size of the scrap label. The narrow release skip in the scrap label 14*s* is configured longer than the stealth tie for the removable labels to prevent unintended liberation of the scrap label from the release liner.

However, the minuscule stealth ties for the removable labels may have effective performance for preventing premature delamination in printer transport with an individual size in area substantially less than about 1 percent of the adhesive area of the individual ties, with a practical limit on tie size being that for preventing damage or tearing of the label or liner when the label is peeled away from the liner.

In view of the substantial performance of the narrow silicone-skip stealth tie 32, only one or two of the stealth ties are required along any common edge of the individual labels for effectively preventing premature delamination inside the printer.

For example, for the four small labels D–G illustrated in FIG. 1, a single stealth tie 32 is sufficient along the corresponding leading edges thereof to prevent premature delamination. For the four remaining relatively large labels A/B, C,H,I, only two stealth ties 32 are sufficient along the corresponding leading edges thereof for preventing premature delamination in the printer.

Note that the large label including portions A & B includes a vertical line of perforations having paper ties therebetween for permitting the common label A/B to be peeled away from the liner, with the label portion A being later torn away from its complementary portion B. Nevertheless, corresponding singular stealth ties 32 are provided for each of the label portions A,B.

For most practical applications of standard sized label sheets, such as eight and one-half inches wide, the correspondingly smaller sized labels formed therein may be adequately retained to the liner with no more than two stealth ties along the common leading edges thereof for preventing premature delamination in the printer. Those two stealth ties are preferably laterally spaced apart in the horizontal direction and located more closely adjacent to the opposite side edges thereof than to the center of the label. This placement effectively ties the corresponding corners of the labels to the liner to prevent premature delamination.

In the preferred embodiment illustrated in FIG. 1, each of the labels 14 may include a pair of the stealth ties 32 aligned vertically or longitudinally with each other on opposite leading and trailing edges for preventing delamination of the labels in the printer irrespective of which end of the label sheet is inserted firstly therein. And, the vertically aligned stealth ties 32 in each label may be additionally used for bridging each label with an adjoining portion of the face sheet under which the individual stealth ties form bridges.

For example, the face sheet 12 illustrated in FIG. 1 may optionally include an integral frame or border 36 adjoining the outer perimeter of the several labels 14 at the common die cut edges therewith. The border, like the individual labels, includes the same adhesive 28 on its backside for commonly adhesively bonding the border to the corresponding perimeter of the release liner 16 to effect the same first bond strength therewith.

In this way, the stealth ties 32 directly adjacent to the leading edge 20 of the face sheet may bridge both the corresponding top labels A,B,C and the border 36 across the corresponding leading edges of those labels.

In this way, the leading edge labels A,B,C in the face sheet are tied at their leading edges to both the underlying liner and the surrounding face sheet border 36. Since the face sheet 12 is preferably a single ply lamina, all of the labels are mounted flush therein for travel through the printer without any raised portions subject to obstruction therein. The stealth ties secure the individual labels at their leading edges to the liner and prevent premature delamination of the labels inside the printer.

As the laminate is transported through the printer, it is subject to bending around narrow drive or guide rollers therein. Bending of the laminate tends to lift the leading edges of the labels, in the same way that labels may be removed from a typical label sheet by sharp bending of the sheet at the label edges. Accordingly, the stealth ties 32 are preferably disposed on the edges of the labels which are disposed parallel with the leading edge 20 of the face sheet. Although the stealth ties are not required on the side edges of the labels disposed perpendicular with the leading edge 20, they could be provided therealong if otherwise desired.

Since the labels 14 illustrated in FIG. 1 are arranged in columns in the longitudinal direction of travel through the printer, the stealth ties 32 are preferably aligned in corresponding columns along the labels, with the columns being disposed substantially perpendicular to the face sheet leading edge 20, or substantially parallel with the longitudinal or length direction of the laminate.

Furthermore, since the drive or pickup rollers in the printer may be located for friction driving the laminate inboard of its opposite side edges, corresponding columns of the stealth ties may be positioned in the laminate in lateral alignment with those pickup rollers for providing retention force at the label leading edges within the direct path of the pickup or drive rollers.

Furthermore, the stealth ties are also preferably aligned in columns to provide a substantially continuous tying bridge from face sheet border to label to label to the form sheet in the intended travel through the printer. The stealth ties may therefore cooperate with each other for maximizing the tying capability thereof with the underlying release liner and longitudinally adjoining portions of the face sheet.

Accordingly, the several stealth ties 32 illustrated in FIG. 1 are preferentially configured and located for tying the individual labels to the release liner for providing isolated ties of substantially increased bond strength for preventing premature delamination of the labels inside the printer. The stealth ties are local features for maintaining the otherwise easy peel removal of the individual labels from the liner, and do not affect the bond strength uniformity over the entire surface area label, except locally at the discrete ties. The individual ties preferably have a narrow, line configuration disposed perpendicular to the face sheet leading edge for maximizing their retention capability in the direction of longitudinal travel through the printer, while minimizing their retention capability along their narrow width for permitting easy peeling of the labels along the corresponding horizontal edges of the labels.

FIG. 4 illustrates in exaggerated view the relatively small width W of the stealth tie 32 in the horizontal or transverse direction of the label laminate. Correspondingly, FIG. 5 illustrates in exaggerated view the relatively long length of the stealth tie 32 along the longitudinal or travel direction of the label laminate, and its substantial bridging effect at the corresponding die cuts 24 between adjoining labels 14.

In view of the narrow width W of the stealth tie 32 illustrated in FIG. 4, its increased bonding effect is readily broken when the label 14 is peeled away from the liner.

In view of the relatively long length L of the stealth tie 32 in the running direction, the increased bonding force thereat effectively bridges the label edges to the underlying release liner for effectively resisting imposed bending forces during travel in the printer.

However, after printing of the label laminate in the printer, the individual labels may be easily peeled away from the release liner with normal peel forces over substantially the entire surface area of the label, with a barely perceptible increase in peel force required at the corresponding stealth ties. Once any edge of an individual label is peeled away from the liner, the user enjoys the substantial leverage provided by the peeled portion of the label to remove the remainder of the label without regard for the increased bonding strength at the minuscule area provided by the stealth ties.

FIG. 5 illustrates schematically one of the labels being peeled away from the liner 16 in which the adhesive 28 itself will preferably tear at the small stealth ties 32 without otherwise causing damage to the label being removed. The majority of the label is laminated to the release coating 30, and the bond therewith is readily broken without damage or tearing of the adhesive thereat.

FIGS. 1–5 illustrate the preferred embodiment of the present invention in which the stealth tie 32 is formed by the local skip or interruption in the release coating 30 for effecting a locally stronger adhesive bond at the locations of the stealth ties themselves. The release skips are readily created by pattern printing the liquid silicone on the liner substrate. The face sheet is then adhesively laminate to the liner. And, the face sheet is finally die cut to define the label edges located above the silicone skips within the manufacturing tolerances of the die cutting process.

Figure 6:
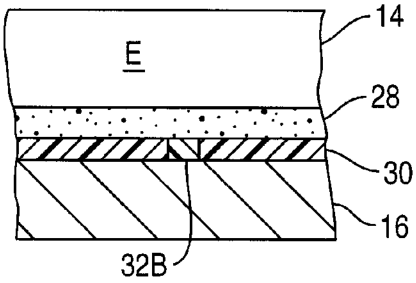
FIG. 6 is an enlarged sectional view, like FIG. 4, illustrating the stealth tie in accordance with another embodiment of the present invention.

FIG. 6 illustrates an alternate embodiment of the stealth tie, designated 32B in the form of a skip in the first release coating 30 replaced by a different second release coating being tighter than the first release coating to effect the higher second bond strength therewith. In this embodiment, the adhesive 28 is uniform over the entire back surface of the individual labels 14. And, the first release coating 30 is uniform over the release liner 16 except at the local skip therein which is replaced by the second release coating.

The first release coating 30 may have a conventional premium release characteristic having a relatively low peeling force requirement for removing the adhesive label therefrom. The second release coating defining the stealth tie 32B may have a conventional tighter formulation so that the common adhesive forms a locally stronger bond therewith.

Since the adhesive bond strength with the second release coating is less than that for the release skip illustrated in the first embodiment disclosed above, the size of the stealth ties 32B should be suitably larger than those illustrated for the first embodiment of the stealth 32. Nevertheless, the stealth ties 32B remain isolated in discrete configurations of minuscule surface area compared to substantially the entirety of the remaining bond area between the individual labels and the liner.

Figure 7:
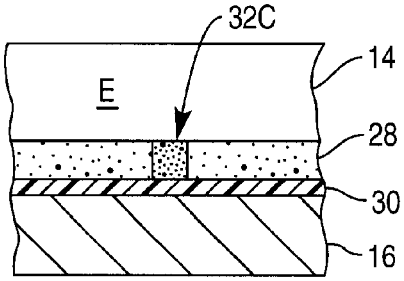
FIG. 7 is an enlarged sectional view, like FIG. 4, illustrating the stealth tie in accordance with another embodiment of the present invention.

FIG. 7 illustrates yet another embodiment of the stealth tie, designated 32C, in the form of a skip in the label first adhesive 28 which is replaced by a second adhesive therein being stronger or tighter than the first adhesive to effect the higher second bond strength with the liner. In this embodiment, the release liner 16 includes a uniform and continuous release coating 30 thereon. The individual labels 14 include a uniform first adhesive 28 over the entire back surface thereof for effecting the first bond strength with the release liner, with the skip in the first adhesive being replaced by the stronger second adhesive effecting the stealth tie.

In practice, it is more economical to merely provide the skips in the release coating 30 in accordance with the first embodiment illustrated in FIGS. 1–5, than to provide the two forms of release coatings in FIG. 6 or the two forms of adhesive in FIG. 7. The release skip defining the first form of the stealth tie 32 maximizes the available bond strength in the minimum of area rendering the stealth ties 32 not only hidden or effectively invisible behind the face sheet, but almost imperceptible or invisible in view of their minuscule size.

In practice, upon removal of an individual label from the release liner, the 15 mil narrow silicone skip is practically invisible to the naked eye especially since the silicone itself is clear and the underlying liner substrate is of uniform color, typically white.

The resulting label laminate including the various forms of the stealth ties maintains perimeter continuity of the label die cuts which permits their easy removal from the liner with clean edges without tearing with the adjoining portions of the face sheet. The stealth ties are hidden and perform their function in preventing premature delamination without visible recognition to the user of this substantial benefit. The label laminate itself may be identical in appearance to any form of conventional label laminate, with the stealth ties being hidden and not otherwise being known to the user.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which I claim:

1. A label laminate comprising:

a face sheet including an adhesive coated label surrounded by a perimeter cut edge;

a release liner laminated to said label by said adhesive to form a uniform first bond strength therebetween; and an isolated stealth tie hidden between said label and liner, and having at least a portion disposed directly along said label edge to locally bond said label along said label edge to said liner with a second bond strength greater than said first bond strength.

2. A laminate according to claim 1 wherein said label includes a single stealth tie along a common edge thereof.

3. A laminate according to claim 1 wherein said label includes only two stealth ties along a common edge thereof.

4. A laminate according to claim 1 wherein said label includes no more than two stealth ties along a common edge thereof.

5. A laminate according to claim 1 wherein said stealth tie is minuscule with a length greater than a width thereof, and said tie width is greater than about 10 mils.

6. A laminate according to claim 1 wherein said stealth tie has a width greater than about 10 mils and up to about 20 mils.

7. A laminate according to claim 1 wherein said stealth tie is minuscule in surface bend area compared to substantially the entirety of the remaining bond area between said label and liner.

8. A laminate according to claim 1 wherein said first bond strength is uniform over substantially the entirety of said label except at said stealth tie.

9. A laminate according to claim 1 wherein said liner includes a uniform release coating thereon bonded to uniform adhesive on said label over a majority of the surface area therebetween, except at said stealth tie.

10. A laminate according to claim 1 wherein said label cut edge is continuous around the perimeter of said label, and said stealth tie is locally hidden behind said edge without interrupting perimeter continuity.

11. A laminate according to claim 1 wherein said label edge is continuous adjacent said stealth tie.

12. A laminate according to claim 1 wherein said label has a die cut perimeter edge, and said stealth tie has a length bridging said label edge being substantially no greater than about double the tolerance range in position of said die cut label edge on said liner.

13. A laminate according to claim 1 wherein said stealth tie is elongate with a length greater than a width thereof.

14. A laminate according to claim 13 wherein said stealth tie is rectangular.

15. A laminate according to claim 13 wherein said stealth tie has an area less than about 1 percent of the adhesive area of said label.

16. A laminate according to claim 13 wherein said label includes no more than two stealth ties along a common edge thereof.

17. A laminate according to claim 13 wherein said face sheet further comprises a border adjacent said label and commonly adhesively bonded to said liner to effect said first bond strength therewith, and said stealth tie bridges both said label and border across said label edge.

18. A laminate according to claim 13 wherein:

said release liner includes a uniform first release coating thereon for effecting said first bond strength with said label adhesive; and said stealth tie comprises a skip in said first release coating having a second release coating therein being tighter than said first release coating to effect said second bond strength therewith.

19. A laminate according to claim 13 wherein:

said release liner includes a uniform release coating thereon;

said label includes a uniform first adhesive thereon; and said stealth tie comprises a skip in said label first adhesive having a second adhesive therein being tighter than said first adhesive to effect said second bond strength.

20. A laminate according to claim 13 wherein said stealth tie is inclined from said label edge.

21. A laminate according to claim 20 wherein said label has a die cut edge, said stealth tie bridges said label edge, and said tie length is substantially no greater than about double the tolerance range in position of said die cut label edge on said liner.

22. A laminate according to claim 20 wherein said stealth tie is substantially perpendicular to said label edge.

23. A stealth tie according to claim 13 wherein said stealth tie width is up to about 20 mils.

24. A laminate according to claim 23 wherein said stealth tie length is up to about 250 mils.

25. A laminate according to claim 13 further comprising a pair of said stealth ties aligned with each other on opposite edges of said label.

26. A laminate according to claim 25 wherein said face sheet has a leading edge for first entering a printer, and said stealth ties are disposed on edges of said label disposed parallel with leading edge.

27. A laminate according to claim 13 wherein:

said release liner includes a release coating thereon; and said stealth tie comprises a skip in said release coating devoid thereof forming a direct bond with said adhesive on said label.

28. A laminate according to claim 27, wherein said stealth tie is minuscule in area to prevent a permanent bond between said label and liner at said skip.

29. A laminate according to claim 13 further comprising:

a plurality of said labels disposed in said face sheet with corresponding die cut label edges; and all of said labels include respective ones of said stealth ties at corresponding edges thereof.

30. A laminate according to claim 29 wherein a pair of said labels adjoin each other along a common die cut edge, and a common one of said stealth ties bridges said label pair.

31. A laminate according to claim 30 further comprising a form sheet joined to said face sheet and extending from said liner.

32. A laminate according to claim 31 wherein said face sheet has a leading edge for first entering a printer before said form sheet, and said stealth ties are aligned in columns along said labels and disposed substantially perpendicular to said leading edge.

* * * * *